United States Patent
Jang

(10) Patent No.: US 11,178,056 B2
(45) Date of Patent: Nov. 16, 2021

(54) COMMUNICATION METHOD AND APPARATUS FOR OPTIMIZING TCP CONGESTION WINDOW

(71) Applicant: Electronics and Telecommunications Research Institute, Daejeon (KR)

(72) Inventor: Soo Young Jang, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 28 days.

(21) Appl. No.: 16/812,018

(22) Filed: Mar. 6, 2020

(65) Prior Publication Data

US 2020/0322272 A1 Oct. 8, 2020

(30) Foreign Application Priority Data

Apr. 8, 2019 (KR) .................. 10-2019-0040956

(51) Int. Cl.
| | |
|---|---|
| *H04L 12/801* | (2013.01) |
| *H04L 12/807* | (2013.01) |
| *G06N 3/02* | (2006.01) |
| *H04L 12/841* | (2013.01) |
| *H04L 29/06* | (2006.01) |

(52) U.S. Cl.
CPC ............. *H04L 47/193* (2013.01); *G06N 3/02* (2013.01); *H04L 47/27* (2013.01); *H04L 47/283* (2013.01); *H04L 69/163* (2013.01)

(58) Field of Classification Search
CPC ..... H04L 47/283; H04L 47/27; H04L 47/193; H04L 69/40; H04L 69/163; H04L 12/801; H04L 12/807; H04L 29/06; H04L 12/841; G06N 3/02; G06N 3/006; G06N 3/0445; G06N 3/08

USPC .......................................................... 370/235
See application file for complete search history.

(56) References Cited

U.S. PATENT DOCUMENTS

| | | | |
|---|---|---|---|
| 7,054,317 B1* | 5/2006 | Jung | H04L 47/20 370/395.1 |
| 7,394,764 B2* | 7/2008 | Ramani | H04L 1/1635 370/231 |
| 7,912,060 B1* | 3/2011 | Chen | H04L 47/27 370/392 |
| 8,588,189 B2 | 11/2013 | Lee et al. | |
| 8,976,671 B2* | 3/2015 | Mutoh | H04L 43/00 370/237 |
| 10,033,653 B2* | 7/2018 | Persson | H04L 47/25 |
| 10,284,480 B2* | 5/2019 | Xie | H04L 47/263 |

(Continued)

FOREIGN PATENT DOCUMENTS

| | | |
|---|---|---|
| WO | 2015144211 A1 | 10/2015 |
| WO | 2016065676 A1 | 5/2016 |

*Primary Examiner* — Man U Phan
(74) *Attorney, Agent, or Firm* — Wlliam Park & Associates Ltd.

(57) ABSTRACT

Disclosed is a communication method for transmitting a packet in an environment where a plurality of networks or communication schemes coexist. A communication method according to an exemplary embodiment of the present disclosure may comprise receiving at least one observation value or reward-related information for network states; determining a transmission control protocol (TCP) congestion window size based on the at least one observation value or the reward-related information; and transmitting a packet according to the determined TCP congestion window size.

12 Claims, 3 Drawing Sheets

(56) References Cited

U.S. PATENT DOCUMENTS

| | | | |
|---|---|---|---|
| 10,492,097 B2 * | 11/2019 | Lee | H04L 47/283 |
| 10,630,573 B2 * | 4/2020 | Pugaczewski | H04L 45/08 |
| 10,771,348 B2 * | 9/2020 | Puleri | H04L 41/147 |
| 2007/0223395 A1 * | 9/2007 | Lee | H04W 28/0273 370/252 |
| 2008/0101290 A1 * | 5/2008 | Sung | H04L 1/1874 370/331 |
| 2012/0163165 A1 | 6/2012 | Ra et al. | |
| 2017/0290005 A1 | 10/2017 | Lin et al. | |
| 2018/0349803 A1 | 12/2018 | Jorgensen et al. | |
| 2018/0351816 A1 * | 12/2018 | Li | H04L 41/0823 |
| 2019/0156197 A1 * | 5/2019 | Dasgupta | G06N 7/005 |
| 2019/0200246 A1 | 6/2019 | Kerpez et al. | |
| 2019/0325304 A1 * | 10/2019 | Gottin | G06N 3/08 |
| 2020/0364555 A1 * | 11/2020 | Grau-Moya | G06N 7/005 |

\* cited by examiner

COMMUNICATION METHOD AND APPARATUS FOR OPTIMIZING TCP CONGESTION WINDOW

CROSS-REFERENCE TO RELATED APPLICATIONS

This application claims priority to Korean Patent Application No. 10-2019-0040956 filed on Apr. 8, 2019 with the Korean Intellectual Property Office (KIPO), the entire contents of which are hereby incorporated by reference.

BACKGROUND

1. Technical Field

The present disclosure relates generally to a communication method and a communication apparatus, and more specifically, to a communication method and a communication apparatus for optimizing a TCP congestion window.

2. Related Art

In an environment where many agents are connected to a network and operate to accomplish given tasks, it is becoming increasingly difficult to centrally manage and operate these agents. As a result, distributed intelligence technology, which implements intelligence in each agent and enables autonomous cooperation among agents, is becoming increasingly important. The distributed intelligence is a prerequisite for several small intelligences and autonomous cooperation based on these intelligences. In the distributed intelligence technology, communications that enable interaction between numerous agents and surrounding Internet of Thing (IoT) objects and collaboration between the agents are core technologies, and it is essential to optimize the communications between the agents and objects in various network environments. The greater the number of agents and the more diverse the environment, the greater the importance thereof will be.

Recently, due to the development and introduction of various network technologies such as mobile edge computing, network function virtualization (NFV)/software defined networking (SDN), fifth generation (5G) communications, etc. and the emergence and proliferation of various wireless end devices such as smartphones, laptops, kiosks, automobiles, etc., the diversity of the network is increasing and the network structure is becoming more and more complicated. Accordingly, network dynamics have increased significantly, and the extent and width of network state fluctuations in a throughput, a round trip time (RTT), and a packet loss rate (PLR) are increasing, and it is becoming near impossible to perform modeling of the networks. Thus, using the existing rule-based optimization techniques to optimize communications between the agents located on such the networks is no longer a valid solution.

SUMMARY

Accordingly, exemplary embodiments of the present disclosure provide a communication method for optimizing a TCP congestion window size based on a training.

Also, exemplary embodiments of the present disclosure also provide a communication apparatus for optimizing a TCP congestion window size based on a training.

According to an exemplary embodiment of the present disclosure, a communication apparatus for transmitting a packet, in an environment where a plurality of networks or communication schemes coexist, may comprise a processor; and a memory storing at least one instruction executable by the processor. Also, the at least one instruction may cause the processor to: receive at least one observation value or reward-related information for network states; determine a transmission control protocol (TCP) congestion window size based on the at least one observation value or the reward-related information; and transmit a packet according to the determined TCP congestion window size.

In the determining of the TCP congestion window size, the at least one instruction may further cause the process to determine the TCP congestion window size using a trained function approximator.

The function approximator may be trained using a reinforcement learning scheme or a supervised learning scheme.

The function approximator may be a deep neural network (DNN) having at least one state as input nodes and at least one action as output nodes.

The at least one state may include one or more of an average packet transmission interval, an average round trip time (RTT), an average acknowledgement (ACK) arrival interval, a TCP congestion window size, and a packet loss rate.

Each node of the at least one action may correspond to each place value of the TCP congestion window size expressed in decimal.

The TCP congestion window size output by the function approximator may be calculated as a decimal value by multiplying a value of the each node of the at least one action node by a place value corresponding to the each node of the at least one action node.

The state node of the function approximator may have a value of a form in which a current state and past states of a network are stacked.

The function approximator may further include a long short-term memory model (LSTM).

The reward may include information that a network feeds back to the communication apparatus for an action of the communication apparatus.

Furthermore, according to an exemplary embodiment of the present disclosure, a communication method for transmitting a packet, in an environment where a plurality of networks or communication schemes coexist, may comprise receiving at least one observation value or reward-related information for network states; determining a transmission control protocol (TCP) congestion window size based on the at least one observation value or the reward-related information; and transmitting a packet according to the determined TCP congestion window size.

The determining of the TCP congestion window size may comprise determining the TCP congestion window size using a trained function approximator.

The function approximator may be trained using a reinforcement learning scheme or a supervised learning scheme.

The function approximator may be a deep neural network (DNN) having at least one state as input nodes and at least one action as output nodes.

The at least one state may include one or more of an average packet transmission interval, an average round trip time (RTT), an average acknowledgement (ACK) arrival interval, a TCP congestion window size, and a packet loss rate.

Each node of the at least one action may correspond to each place value of the TCP congestion window size expressed in decimal.

The TCP congestion window size output by the function approximator may be calculated as a decimal value by multiplying a value of the each node of the at least one action node by a place value corresponding to the each node of the at least one action node.

The state node of the function approximator may have a value of a form in which a current state and past states of a network are stacked.

The function approximator may include a long short-term memory model (LSTM).

The reward may include information that a network feeds back to the communication apparatus for an action of the communication apparatus.

According to the exemplary embodiments of the present disclosure as described above, it is made possible to quickly cope with a rapidly changing channel situation in an environment in which various networks coexist. In addition, by solving the problem of partial observability of the network state, a more accurate determination of the network state is made possible. Further, since the exemplary embodiments of the present disclosure are related to technical matters applied to a TCP transmitter, they can be easily applied to existing networks.

BRIEF DESCRIPTION OF DRAWINGS

Embodiments of the present disclosure will become more apparent by describing in detail embodiments of the present disclosure with reference to the accompanying drawings, in which.

Figure 1:
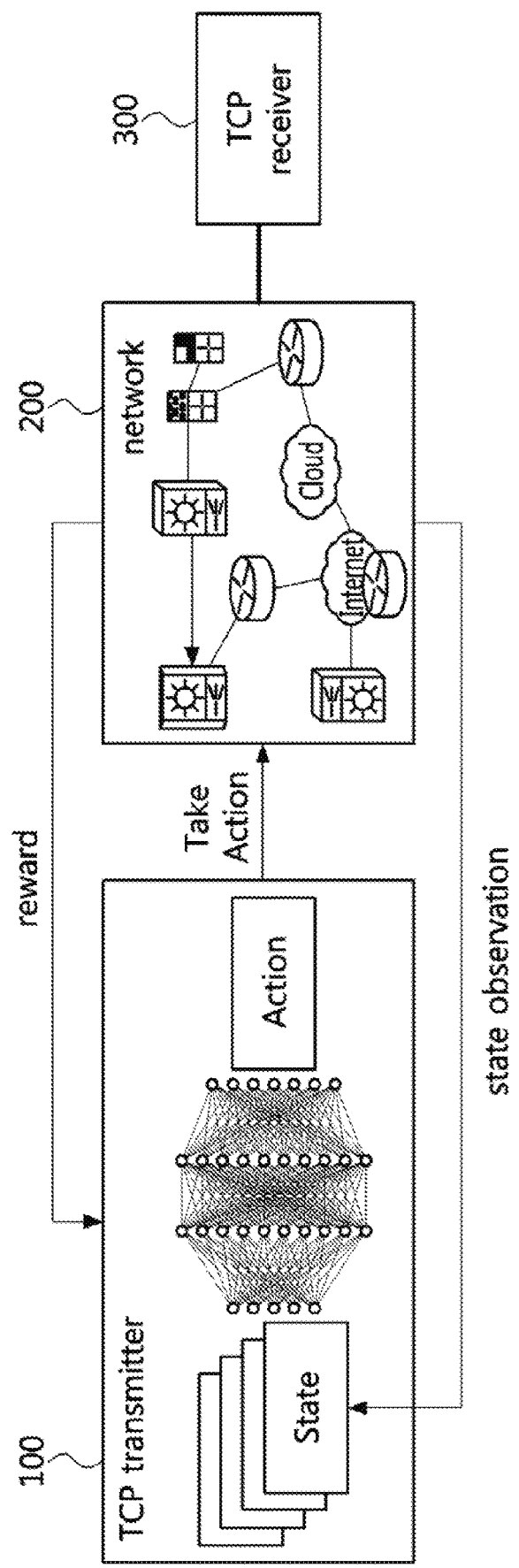
FIG. 1 is a block diagram of a communication optimization system according to an exemplary embodiment of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The transmission control protocol (TCP) technologies, such as the freeze-TCP targeting mobile networks, the CUBIC which is Linux's default congestion control algorithm, the data center TCP (DCTCP) targeting data centers, and the recently used bottleneck bandwidth and round-trip propagation time (BBR), are topics that have been widely studied for a long time and are subjects that have been steadily being studied. In the background of such the continuous researches, there is a fact that most of them are based on finding optimal rules through network modeling and analysis, and network models keep changing with the development of network technologies. This may mean that a fixed rule-based TCP congestion control does not guarantee high performance in an environment in which various network technologies coexist and network states change.

Accordingly, the present disclosure is to propose a TCP congestion control method that can continuously observe the network environment and learn by itself according to the change of the network environment.

Hereinafter, exemplary embodiments of the present disclosure will be described in detail with reference to the accompanying drawings.

FIG. 1 is a block diagram of a communication optimization system according to an exemplary embodiment of the present disclosure.

As shown in FIG. 1, a communication optimization system according to an exemplary embodiment of the present disclosure may comprise a TCP transmitter 100, a TCP receiver 300, and a network 200 located between the TCP transmitter 100 and the TCP receiver 300.

The TCP transmitter 100 may comprise a unit of observing or receiving information such as network state values and rewards from the network 200, and the like, a unit of determining a TCP congestion window size based on the input information, and a unit of transmitting packets based on the determined TCP congestion window.

Meanwhile, in the example shown in FIG. 1, a communication apparatus is referred to as the 'TCP transmitter 100' to more easily describe a function or operation according to the exemplary embodiment of the present disclosure. When the TCP transmitter 100 receives a packet through the network, it may also be a receiver, and when the TCP receiver 300 transmits a packet, it may also be a TCP transmitter.

The network 200 is a network located between the TCP transmitter 100 and the TCP receiver 300, and may be configured to include a wired/wireless Internet, a cloud, and the like, and may further provide a reward value to the TCP transmitter as necessary.

The TCP transmitter may observe network states and use the observation values as inputs to a function approximator (e.g., deep neural network (DNN)) to determine the size of the TCP congestion window, which is an optimal action. The TCP transmitter according to an exemplary embodiment of the present disclosure may use a learning-based scheme rather than a fixed rule-based scheme to learn parameters of the function approximator. The learning scheme therefor may use a supervised learning based on state-optimal action mapping or a reward based reinforcement learning.

The supervised learning is a technique of learning by receiving appropriately labeled learning data from an expert in a domain. By learning through the provided learning data, it can be expected to provide appropriate outputs even for new inputs.

The reinforcement learning has been proposed as a method for solving problems such as a sequential decision problem, a behavior control problem, and the like. The reinforcement learning is a technique of learning a policy maximizing a discounted cumulative reward through rewards resulting from actions taken by interacting with the environment through exploration and exploitation. Here, the policy may play a role of deciding which action is to be taken for a current state, and the policy may be usually probabilistic. That is, the reinforcement learning is learning about an action that can maximize the reward in a given situation (or state), and it is common to require a lot of trials and errors before an agent of the learning finds the best action for the given situation. The reward may be information or a number that the environment transmits to the agent (e.g., TCP transmitter) whenever the agent takes an action.

Typically, the reward may be expressed as a probability function for a state and an action.

Such the problem solving scheme of the reinforcement learning is a problem solving scheme that goes well with TCP congestion control, which is a sequential decision problem in which parameters such as a congestion window (CWND), etc. should be determined at each time of occurrence of a specific event such as ACK arrival.

In addition, the TCP transmitter according to the exemplary embodiment of the present disclosure may not determine whether to increase or decrease the TCP congestion window size when determining the TCP congestion window size, but rather determine the TCP congestion window size itself. Since a typical TCP transmitter considers an action space that increases or decreases the CWND, it is difficult to cope with a dynamically changing network environment due to rapid channel fluctuations. In contrast, the TCP transmitter according to the exemplary embodiment of the present disclosure can respond quickly to a rapidly changing network environment by using the TCP CWND size itself as an action space.

In addition, the exemplary embodiment of the present disclosure may use past state values together with current state values when inputting the network state values. In general, the TCP transmitter does not know the entire information about network topology, capacity, traffic flows, etc., and thus performs congestion control using only partial information that can be observed. That is, the conventional TCP devices based on the reinforcement learning may operate without considering such the partial observability of the network states, and thus performance may be degraded when determining an action using only the current observation. Therefore, the exemplary embodiment of the present disclosure may use the past state values together with the current state values when inputting the network state values.

As such, various wired/wireless network technologies are mixed in the recent network environment, and thus network modeling is impossible and network states such as bandwidth, RTT, etc. may rapidly fluctuate. In order to improve the network performance in such the network environment, the exemplary embodiment of the present disclosure provides a method of optimizing the TCP, which occupies most of network traffic, and more specifically, a method and an apparatus for determining the TCP CWND size on the basis of learning, not rules.

Figure 2:
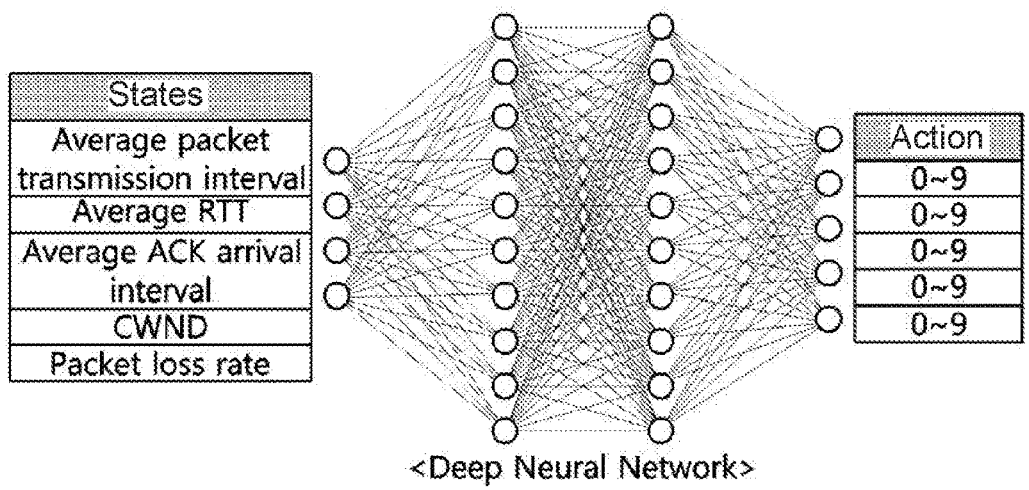
FIG. 2 is a conceptual diagram illustrating a state and an action of a function approximator according to an exemplary embodiment of the present disclosure.

FIG. 2 is a conceptual diagram illustrating a state and an action of a function approximator according to an exemplary embodiment of the present disclosure.

More specifically, FIG. 2 illustrates a state space, which are inputs of a DNN, and an action space, which are outputs of the DNN. The DNN may be used as a function approximator in an exemplary embodiment of the present disclosure. As described above, the TCP transmitter according to the exemplary embodiment of the present disclosure may use the function approximator to determine the CWND size. In FIG. 2, a DNN may be used as an example of the function approximator to describe the state space and the action space according to the exemplary embodiment of the present disclosure.

The function approximator is a concept of determining a certain tendency of data and making a function based on the determined tendency when the amount of data used is huge and there is a limit to storing all of them. The function approximator may be advantageous in that data that are not actually available can be obtained through the function, learning can be performed by excluding noises of actual data, and high-dimension data can be stored efficiently. For example, when each data is expressed in form of $ax^3+bx^2+cx+d$, instead of storing all the actual data, only the parameters (a, b, c, d) may be stored and used. Like this, the reinforcement learning does not use tables to store values to deal with large dimensions, but rather uses a parameterized function for new variables. The function approximator may refer to an entity of playing a role of using these parameters to approximate actual values.

Meanwhile, the exemplary embodiment of the present disclosure may use a Deep Neural Network (DNN) as a preferred exemplary embodiment of the function approximator. The DNN is an Artificial Neural Network (ANN) including multiple hidden layers between an input layer and an output layer. The ANN has a form in which several neurons, which are basic computing units, are connected by weighted links, which may be implemented in hardware, but mainly in computer software.

Referring to FIG. 2, the state space, which are inputs of the DNN, may include information that the TCP transmitter can observe from the network, information that the TCP receiver can observe from the network, and information that the network can provide separately.

The information that the TCP transmitter can observe from the network may include an average packet transmission interval, an average ACK arrival interval, an average RTT, a CWND, a packet loss rate, and the like. The information that the TCP receiver can observe may include an average packet reception interval, an average ACK transmission interval, and the like. In addition, the information that the network can provide separately may include the number of packets present in a router queue, the number of TCP transmitters currently present in the network, a current link utilization, and the like.

The action space, which are outputs of the DNN, may be set to a CWND size value. Unlike the conventional methods of additive increase and multiplicative decrease (AIMD), additive increase and additive decrease (AIAD), and the like, the exemplary embodiment of the present disclosure may actually determine the CWND value directly by setting the CWND value in the action space. In this case, if the action space is defined to directly determine the actual CWND value, the size of the action space may increase. To solve this problem, the exemplary embodiment of the present disclosure provides a method of matching each output node of the function approximator to a CWND position.

Figure 3:
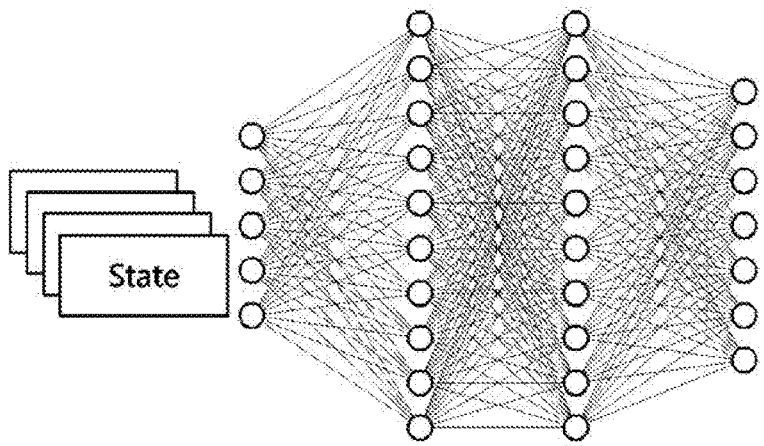
FIG. 3 is a conceptual diagram illustrating an exemplary embodiment of a state input of a function approximator according to an exemplary embodiment of the present disclosure.

FIG. 3 is a conceptual diagram illustrating an exemplary embodiment of a state input of a function approximator according to an exemplary embodiment of the present disclosure.

FIG. 3 illustrates a concept of a method of configuring stacked states as input values of the function approximator in order to solve the partial observability problem of the network states.

The stacked states may mean that not only the current state but also the states of the past several steps are stacked. In addition to using the stacked states to modify input values, a Recurrent Neural Network (RNN) such as Long Short-Term Memory models (LSTM) may be added to the function approximator. It is also possible to use both the method of using the stacked states and the method of adding the separate RNN together. This will solve the problem of partial observability because it can make decisions based on historical information.

Figure 4:
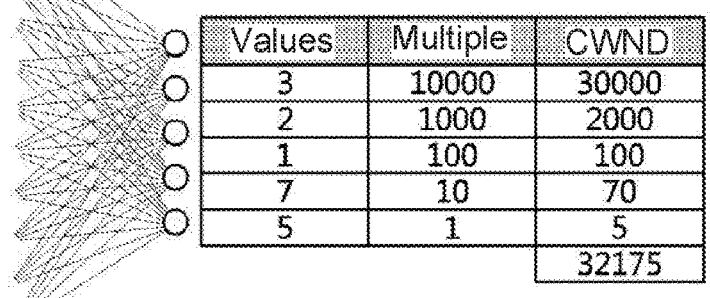
FIG. 4 is a conceptual diagram illustrating an exemplary embodiment of an action output of a function approximator according to an exemplary embodiment of the present disclosure.

FIG. 4 is a conceptual diagram illustrating an exemplary embodiment of an action output of a function approximator according to an exemplary embodiment of the present disclosure.

As described in the exemplary embodiment of FIG. 2, the CWND size value may be actually determined directly by configuring the CWND size value in the action space. In this case, if the output nodes of the DNN used as the function approximator are configured for the actual CWND value, the size of the action space of the DNN may become large and learning thereof may become difficult. To solve this problem, the present exemplary embodiment provides a method of matching each output node of the function approximator to each position of the CWND.

In FIG. 4, an example of CWND calculation according to the configuration of the action space is shown. Referring to FIG. 4, that is, when five output nodes are assumed, output values of the output nodes 1, 2, 3, 4, and 5 of the DNN may be 3, 2, 1, 7, and 5, respectively. In the present exemplary embodiment, each output node may correspond to, for example, each digit of the size value of the congestion window expressed in decimal, for example. Accordingly, in this case, the actual size value of the congestion window indicated by the output nodes of FIG. 4 may be 32,175.

Using the above-described method, for example, it is possible to reduce the data required for the action space from 100,000 (i.e., 0 to 99,999) to 50. That is, according to the exemplary embodiment shown in FIG. 4, an effect of reducing the number of action spaces required to express the actual value of the congestion window can be obtained.

In this case, the number of output nodes may be configured differently according to a target environment. When the CWND value is expressed up to 9,999 in a given network environment, the number of required output nodes may be four.

That is, the output node of the DNN used as the function approximator according to the exemplary embodiment of the present disclosure may correspond to one of decimal place values of the size value of the congestion window expressed in decimal. Accordingly, the output node of the DNN may have a value of 0 to 9, and the size of the congestion window may be derived by multiplying the value of each output node by a place value (e.g., 1, 10, 100, 1000, or the like) of the corresponding output node.

Figure 5:
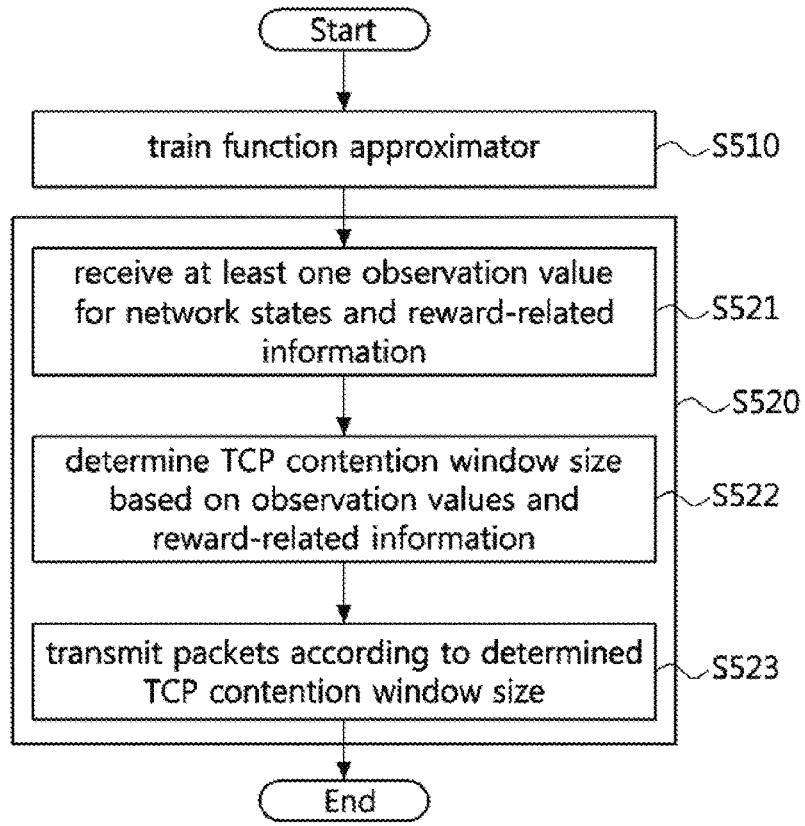
FIG. 5 is an operation flowchart of a communication method of configuring an optimal TCP congestion window size value according to an exemplary embodiment of the present disclosure.

FIG. 5 is an operation flowchart of a communication method of configuring an optimal TCP congestion window size value according to an exemplary embodiment of the present disclosure.

The TCP CWND configuration method shown in FIG. 5 may be performed by the TCP transmitter described based on an exemplary embodiment of the present disclosure, but an operation subject is not limited thereto. The communication method according to an exemplary embodiment of the present disclosure relates to a communication method for transmitting a packet in an environment in which a plurality of networks or communication schemes coexist.

In the communication method according to the exemplary embodiment of the present disclosure, a step S510 of training the function approximator may be preceded. The function approximator may be trained using the reinforcement learning scheme or the supervised learning scheme. The function approximator may be, for example, a DNN having at least one state as input nodes and at least one action as output nodes, and may further include a Long Short-Term Memory model (LSTM).

After the training of the function approximator is completed, a step S520 of determining the size of the TCP CWND using the trained function approximator and transmitting a packet using the TCP CWND may follow.

More specifically, the communication apparatus including the trained function approximator may receive at least one observation value about the network states or reward-related information (S521). The communication apparatus may determine a TCP CWND size based on the at least one observation value or the reward-related information received from the network (S522). Thereafter, the TCP transmitter may transmit a packet according to the determined TCP CWND (S523).

On the other hand, although it was described that the size of the TCP CWND is determined using the function approximator and the packet is transmitted using the TCP CWND (S520) after the learning process S510 of the function approximator in the exemplary embodiment of FIG. 5, the learning process S510 of the function approximator may be additionally performed during or after the size determination of the TCP CWND and packet transmission process S520 performed periodically or repeatedly.

Figure 6:
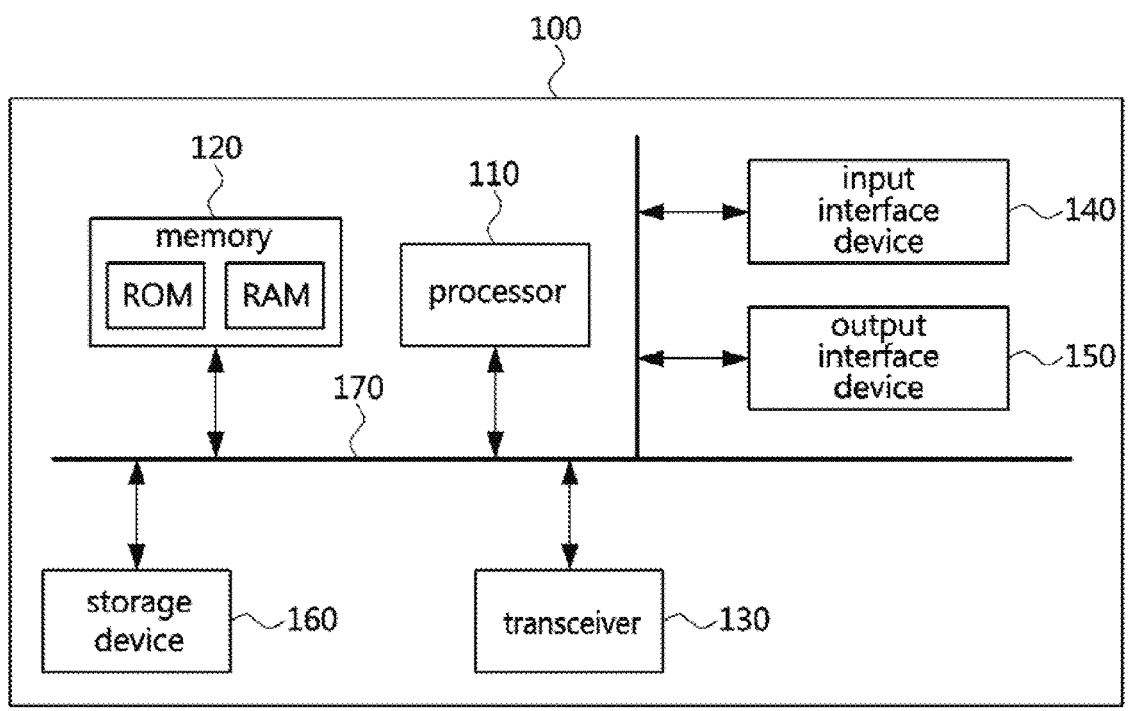
FIG. 6 is a block diagram illustrating a communication apparatus according to an exemplary embodiment of the present disclosure.

FIG. 6 is a block diagram illustrating a communication apparatus according to an exemplary embodiment of the present disclosure.

Referring to FIG. 6, a communication apparatus 100 may comprise at least one processor 110, a memory 120, and a transceiver 130 connected to the network 200 for performing communications. Also, the communication apparatus 100 may further comprise an input interface device 140, an output interface device 150, a storage device 160, and the like. Each component included in the communication apparatus 100 may communicate with each other as connected through a bus 170.

However, each component included in the communication apparatus 100 may not be connected to the common bus 170 but may be connected to the processor 110 via an individual interface or a separate bus. For example, the processor 110 may be connected to at least one of the memory 120, the transceiver 130, the input interface device 140, the output interface device 150 and the storage device 160 via a dedicated interface.

The processor 110 may execute a program stored in at least one of the memory 120 and the storage device 160. The processor 110 may refer to a central processing unit (CPU), a graphics processing unit (GPU), or a dedicated processor on which methods in accordance with embodiments of the present disclosure are performed. Each of the memory 120 and the storage device 160 may be constituted by at least one of a volatile storage medium and a non-volatile storage medium. For example, the memory 120 may comprise at least one of read-only memory (ROM) and random access memory (RAM).

Here, the at least one instruction stored in at least one of the memory 120 and the storage device 160 may cause the processor to receive at least one observation value or reward-related information for network states; determine a TCP CWND size based on the at least one observation value or the reward-related information; and transmit a packet according to the determined TCP CWND size.

In the determining of the TCP congestion window size, the at least one instruction may further cause the process to determine the TCP CWND size using a trained function approximator.

The function approximator may be trained using a reinforcement learning scheme or a supervised learning scheme. In this case, for example, the function approximator may be a deep neural network (DNN) having at least one state as input nodes and at least one action as output nodes, and may further include a long short-term memory model (LSTM).

The at least one state may include one or more of an average packet transmission interval, an average round trip time (RTT), an average ACK arrival interval, a TCP congestion window size, and a packet loss rate.

Here, each node of the at least one action may correspond to each place value of the TCP congestion window size expressed in decimal, and the TCP CWND size output by the function approximator may be calculated as a decimal value by multiplying a value of the each node of the at least one action node by a place value corresponding to the each node of the at least one action node.

Further, the state node of the function approximator may have a value of a form in which a current state and past states of the network are stacked.

The present invention described through the exemplary embodiments described above, first, can quickly cope with a sudden change in the network bandwidth by directly determining the TCP congestion window size. For example, when a mobile terminal moves from a line-of-sight (LoS) section to a non-LoS section or from the non-LoS section to the LoS section in millimeter wave (mmWave) communications, the network bandwidth may change rapidly. In this case, the conventional AIMD or AIAD-based CWND control requires a large RTT, but the present invention can quickly cope with the rapid network environmental change because it directly determines the CWND value optimized for the network states.

Second, the performance of TCP congestion window sizing can be improved by improving the accuracy of approximating the network states by using past network state information to solve the problem of partial observability on the network states.

Third, although TCP congestion control techniques specific to the existing wireless networks have been difficult to deploy because they are cross-layer based, which requires PHY/MAC layer information, the present invention is related to the technical matters applied to the TCP transmitter, and thus can be easily applied to the existing networks.

The method according to the exemplary embodiments of the present disclosure may also be embodied as computer readable programs or codes on a computer readable recording medium. The computer readable recording medium is any data storage device that may store data which can be thereafter read by a computer system. The computer readable recording medium may also be distributed over network coupled computer systems so that the computer readable code is stored and executed in a distributed fashion.

In addition, examples of the computer-readable recording medium may include magnetic media such as hard discs, floppy discs, and magnetic tapes, optical media such as compact disc-read-only memories (CD-ROMs), digital video disc (DVDs), and so on, magneto-optical media such as floptical discs, and hardware devices specially configured (or designed) for storing and executing program commands, such as ROMs, random access memories (RAMs), flash memories, and so on. Examples of a program command may not only include machine language codes, which are created by a compiler, but may also include high-level language codes, which may be executed by a computer using an interpreter, and so on.

Some aspects of the present disclosure have been described in the context of an apparatus but may also represent the corresponding method. Here, a block or the apparatus corresponds to an operation of the method or a characteristic of an operation of the method. Likewise, aspects which have been described in the context of the method may be indicated by the corresponding blocks or items or characteristics of the corresponding apparatus. Some or all of operations of the method may be performed by (or using) a hardware device, such as a microprocessor, a programmable computer, or an electronic circuit. In some embodiments, one or more important steps of the method may be performed by such a device. In the exemplary embodiments of the present disclosure, a programmable logic device (e.g., a field-programmable gate array (FPGA)) may be used to perform some or all of functions of the above-described methods. In the exemplary embodiments, the FPGA may operate in combination with a microprocessor for performing one of the above-described methods. In general, the methods may be performed by any hardware device.

While the exemplary embodiments of the present disclosure and their advantages have been described in detail, it should be understood that various changes, substitutions and alterations may be made herein without departing from the scope of the disclosure.

What is claimed is:

1. A communication apparatus for transmitting a packet to a receiving device in an environment where a plurality of networks or communication schemes coexist, the communication apparatus comprising:
   a processor; and
   a memory storing program code executable by the processor, the program code comprising instructions for:
   training a function approximator which is a deep neural network (DNN) having at least one state as input nodes and at least one action as output nodes;
   receiving at least one observation value or reward-related information for network states from a predetermined network among the plurality of networks;
   determining a transmission control protocol (TCP) congestion window size based on the at least one observation value or the reward-related information using a trained function approximator; and
   trasmitting the packet to the receiving device according to the determined TCP congestion window size through the predetermined network,
   wherein the TCP congestion window size output by the trained function approximator is calculated as a decimal value by multiplying a value of the each node of the at least one action node by a place value corresponding to the each node of the at least one action node.

2. The communication apparatus according to claim 1, wherein the function approximator is trained using a reinforcement learning scheme or a supervised learning scheme.

3. The communication apparatus according to claim 1, wherein the at least one state includes one or more of an average packet transmission interval, an average round trip time (RTT), an average acknowledgement (ACK) arrival interval, a TCP congestion window size, and a packet loss rate.

4. The communication apparatus according to claim 1, wherein a state node of the function approximator has a value of a form in which a current state and past states of a network are stacked.

5. The communication apparatus according to claim 1, wherein the function approximator includes a long short-term memory model (LSTM).

6. The communication apparatus according to claim 1, wherein the reward includes information that a network feeds back to the communication apparatus for an action of the communication apparatus.

7. A communication method of a communication device for transmitting a packet to a receiving device in an environment where a plurality of networks or communication schemes coexist, the communication method comprising:
   processing computer executable program code embodied in non-transitory computer readable storage media by a processor, the computer executable program code comprising:
   program code that trains a function approximator executable by a processor installed in the communication device, the function approximator being a deep neural network (DNN) having at least one state as input nodes and at least one action as output nodes;
   program code that receives at least one observation value or reward-related information for network states a predetermined network among the plurality of networks;
   program code that determines a transmission control protocol (TCP) congestion window size based on the at least one observation value or the reward-related information using a trained function approximator; and
   program code that transmits the packet to the receiving device according to the determined TCP congestion window size through the predetermined network,
   wherein the TCP congestion window size output by the trained function approximator is calculated as a decimal value by multiplying a value of the each node of the at least one action node by a place value corresponding to the each node of the at least one action node.

8. The communication method according to claim 7, wherein the function approximator is trained using a reinforcement learning scheme or a supervised learning scheme.

9. The communication method according to claim 7, wherein the at least one state includes one or more of an average packet transmission interval, an average round trip time (RTT), an average acknowledgement (ACK) arrival interval, a TCP congestion window size, and a packet loss rate.

10. The communication method according to claim 7, wherein a state node of the function approximator has a value of a form in which a current state and past states of a network are stacked.

11. The communication method according to claim 7, wherein the function approximator includes a long short-term memory model (LSTM).

12. The communication method according to claim 7, wherein the reward includes information that a network feeds back to the communication apparatus for an action of the communication apparatus.

* * * * *